United States Patent [19]

Corbach et al.

[11] Patent Number: 5,696,418
[45] Date of Patent: Dec. 9, 1997

[54] ELECTRICAL COMMUTATOR MACHINE

[75] Inventors: Rainer Corbach, Luedinghausen; Wilhelm Latz, Castrop-Rauxel, both of Germany; Kurt Mühlemann, Biberist, Switzerland

[73] Assignee: BT Magnet-Technologie GmbH, Herne, Germany

[21] Appl. No.: 530,320

[22] PCT Filed: Jan. 17, 1995

[86] PCT No.: PCT/DE95/00047

§ 371 Date: Oct. 16, 1995

§ 102(e) Date: Oct. 16, 1995

[87] PCT Pub. No.: WO95/20837

PCT Pub. Date: Aug. 3, 1995

[30] Foreign Application Priority Data

Jan. 27, 1994 [DE] Germany ............ 94 01 357.8 U

[51] Int. Cl.$^6$ .................................. H02K 13/00
[52] U.S. Cl. .................. 310/239; 310/245; 310/242
[58] Field of Search .......................... 310/239, 248, 310/247, 241, 242, 245

[56] References Cited

U.S. PATENT DOCUMENTS

| | | | |
|---|---|---|---|
| 3,784,856 | 1/1974 | Preston | 310/239 |
| 4,613,781 | 9/1986 | Sanders | 310/239 |
| 5,006,742 | 4/1991 | Strobl et al. | 310/88 |
| 5,159,222 | 10/1992 | Southall | 310/239 |
| 5,256,925 | 10/1993 | Cutsforth | 310/247 |

FOREIGN PATENT DOCUMENTS

| | | | |
|---|---|---|---|
| 0123800 | 11/1984 | European Pat. Off. | H01R 39/41 |
| 0397973 | 3/1990 | European Pat. Off. | H01R 39/38 |
| 384686 | 9/1990 | European Pat. Off. | H02K 5/22 |
| 2315790 | 1/1977 | France | H02K 5/14 |
| 1463897 | 7/1969 | Germany | |
| 3149099 | 6/1983 | Germany | H01R 39/38 |
| 3328683 | 2/1985 | Germany | H01R 39/42 |
| 60-20742 | 6/1985 | Japan | H02K 5/14 |

*Primary Examiner*—Clayton E. Laballe
*Assistant Examiner*—Timothy A. Williams
*Attorney, Agent, or Firm*—Michael J. Striker

[57] ABSTRACT

An electrical commutator machine which serves to actuate units is proposed. The commutator machine comprises a ring-like carrying plate, which surrounds the axis of rotation of the commutator, for tubular guide casings which are made of metal, have a square cross section, are permanently connected to said carrying plate and in which brushes belonging to the commutation device are guided along the longitudinal axis of the tube and are placed under load on a contact face of the commutator. A particularly simple and advantageous structure of the commutator machine is produced if, in order to secure the casing on the carrying plate, at least two tongues which are upright with respect to the wall plane are arranged on one of the casing walls, to which tongues there are assigned insertion slits which are located in the one end of the carrying plate and detain the tongues.

10 Claims, 3 Drawing Sheets

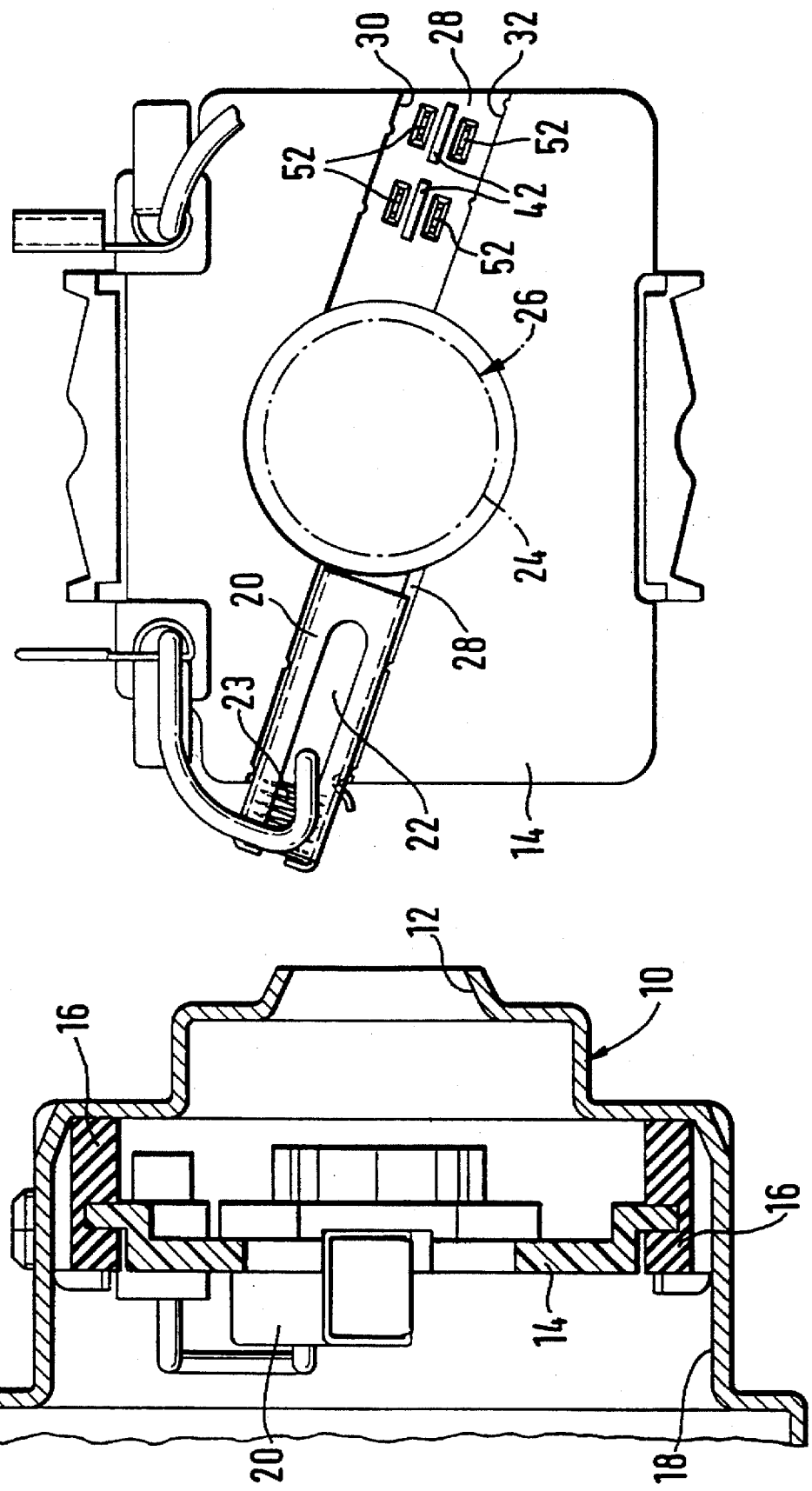

ELECTRICAL COMMUTATOR MACHINE

PRIOR ART

The invention is based on a commutator machine of the generic type of the main claim. A commutator machine is already known in which the brush casings are connected to the brush carrying plate by means of flexural tabs which can be plugged through through-slits in the brush carrying plate; this leads to inaccurate placement of the brushes and associated disadvantages during commutation.

ADVANTAGES OF THE INVENTION

In contrast, the commutator machine according to the invention, having the defining features of the main claim, has the advantage that an exact arrangement of the brush casings is achieved in a simple manner and without the additional bending operation. It has emerged that the measure according to the invention also produces good results in respect of the resistance to being pulled out and the resistance to changes in temperature.

Advantageous developments and improvements of the commutator machine specified in the main claim are possible as a result of the measures cited in the subclaims. It is particularly advantageous if the carrying plate is provided with accommodating slots for the guide casings on its end having the casings and the insertion slits are arranged on the base area of the slot. Furthermore, if a leaf spring-like press-on element is secured by its one end on the one casing wall and the other, free end of the press-on element bears with prestress on that side face of the brush which faces it, the result is particularly low-noise running of the commutator machine, because the brush is guided without play in its casing.

DRAWING

An exemplary embodiment of the invention is illustrated in the drawing and explained in more detail in the following description.

FIG. 1 shows a longitudinal section through a portion of a motor housing provided with a brush carrying plate, FIG. 2 shows a plan view of the brush carrying plate in accordance with FIG. 1 and provided with only one brush, FIG. 3 shows a partial view, in an enlarged illustration, of the brush carrying plate with a brush guide in accordance with FIG. 2, the brush being removed from the brush guide, FIG. 4 shows a section, in an enlarged illustration, along the line IV—IV through the brush carrying plate in accordance with FIG. 3, FIG. 5 shows a side view of the brush guide in accordance with FIG. 3, FIG. 6 shows a section along the line VI—VI in FIG. 5 through the brush guide, in which there is drawn with dot-dashed lines that end section of a brush which is remote from the commutator, FIG. 7 shows a view of the brush guide seen in the direction of the arrow VII in FIG. 5, FIG. 8 shows a partial section of the brush carrying plate, with a brush guide arranged above it in a manner suitable for mounting, and FIG. 9 shows the brush guide connected to the brush carrying plate.

DESCRIPTION OF THE EXEMPLARY EMBODIMENT

Figure 3:
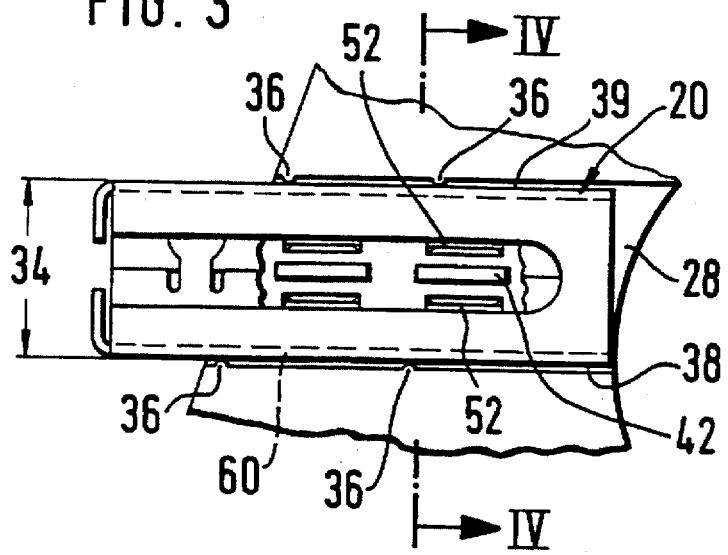
Figure 4:
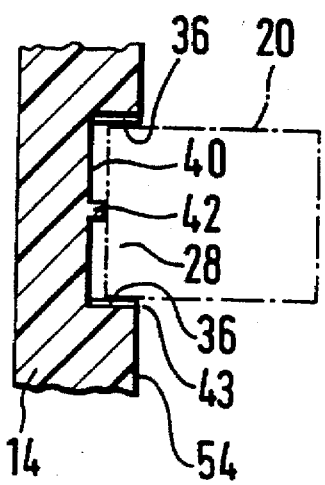
Figure 7:
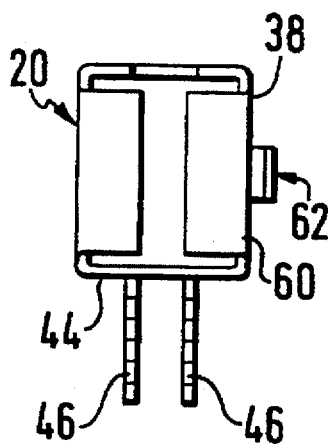
Figure 8:
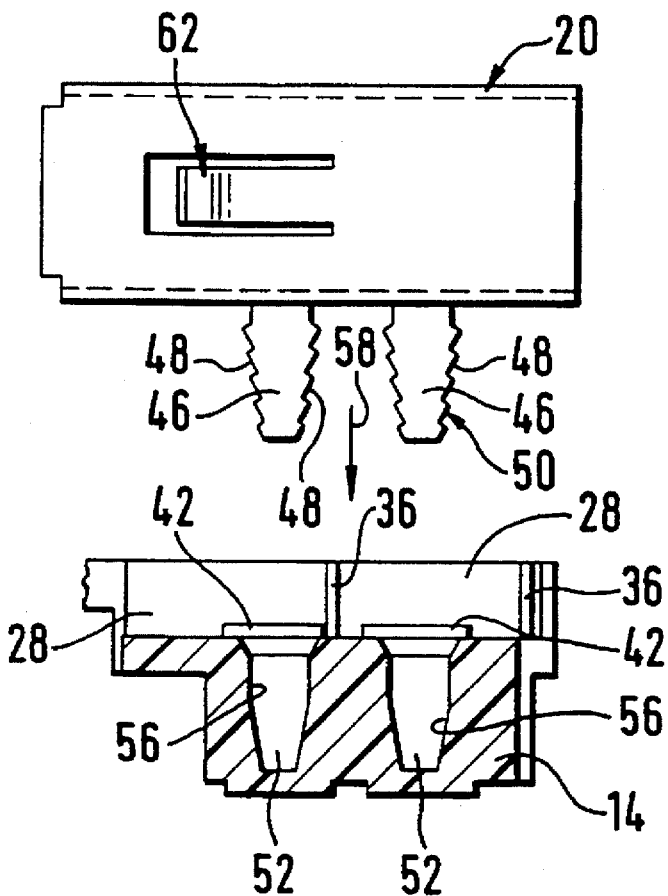
Figure 9:
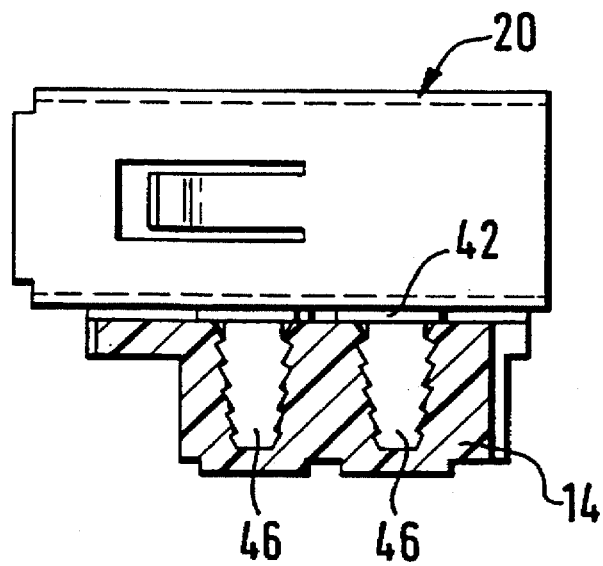

FIG. 1 shows part of a motor housing 10 which belongs to an electrical commutator machine and has a brush carrying plate 14 in addition to a receptacle 12 for an armature shaft bearing (not illustrated). The essentially ring-like brush carrying plate 14 surrounding the axis of rotation of a commutator 26 (FIG. 2) belonging to the machine is supported via rubber-elastic damping elements 16 on the inner wall 18 of the motor housing 10. The brush carrying plate 14 is provided with tubular brush casings 20 which have a square cross section and guide brushes 22 (FIG. 2) belonging to the commutation device of the commutator machine along the longitudinal axis of the tube in such a way that said brushes are placed, under load from stressed springs 23, on a contact face 24 of a commutator 26 which is indicated by dot-dashed lines in FIG. 2. The brush casings 20, which are produced from metal, are permanently connected to the brush carrying plate 14. FIG. 2 illustrates only one of the two brush casings 20. The second brush casing is not mounted. It is evident that a positioning slot 28 in the brush carrying plate 14 is shown instead. FIG. 4 illustrates this positioning slot 28 in cross section. FIGS. 3 and 4 further show that the width of the slots 28 is greater than the width 34 of the brush or guide casings 20 and that there are arranged on the slot side walls 30 and 32 partial raised parts 36, on which the casing walls 38, 40 facing them are held in a fitting manner. This is particularly evident in FIG. 4, which illustrates a cross section through the positioning slot 28 in which a brush casing 20 is drawn with dot-dashed lines. The brush casing 20 is therefore held only by means of the raised parts 36 which are designed as strips in the exemplary embodiment and extend from the base area 40 of the slot 28 to the slot edge 42. FIG. 3 further illustrates that the raised parts 36 on the one slot side wall 30 are offset with regard to the raised parts 36 on the other side wall 32. FIGS. 3 and 4 also show that two strip-like elevations 42 are arranged on the base area 40 of the slot 28. The result of this is that the brush casing 20 seated in the slot 28 is supported only on the raised parts 36 and the elevations 42, which produces excellent conditions in respect of vibration damping and hence of noise reduction. It can be gathered from FIGS. 5 and 7 that the brush casing 20 has on one of the casing walls 44 four tongues 46 which are upright with respect to the wall plane and the side edges 48 of which converge from the casing wall 44 and are provided with a sawtooth profile 50. The tongues 46 are integrally connected to the casing wall 44 and bent out from the wall plane. Insertion slits 52 arranged in the brush carrying plate 14 are assigned to the tongues 46 (FIGS. 3 and 8). When the tongues 46 are pressed into the insertion slits 52, it is ensured by a refinement still to be described in more detail that the tongues 46 fit tightly in the insertion slits 52. The insertion slits 52 which are located in the one end 54 of the brush carrying plate 14— to which the base area 40 of the slot 28 also belongs—are used to accommodate the tongues 46 of the brush casings 20. The sawtooth profile 50 of the tongues 46 is matched to the profile of the insertion slits 52 in such a way that the slit boundaries 56 facing the sawtooth profile 50 are narrower, at least in sections, than the tongue profile.

For mounting, the brush casing is introduced by its insertion tongues 46 into the positioning slot 28 of the brush carrying plate in such a way that, after being pressed in the direction of the arrow 58 (FIG. 8), the insertion tongues 46 pass into the insertion slits 52 in the baseplate 14. When the casing wall 44 comes to bear on the top side of the strip-like elevations 42, the barbed sawtooth profile 50 of the insertion tongues 46 bites into the slit boundaries 56, facing the latter, of the insertion slits 52 in such a way that reliable, proper fitting of the brush casings is ensured. Furthermore, the positioning slot 28, with its strip-like raised parts 36 and the strip-like elevations 42, also ensures proper positioning of the brush casings 20 in relation to the brush carrying plate 14.

Figure 6:
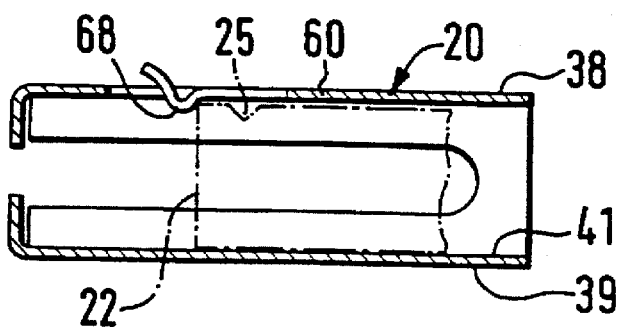
Figure 5:
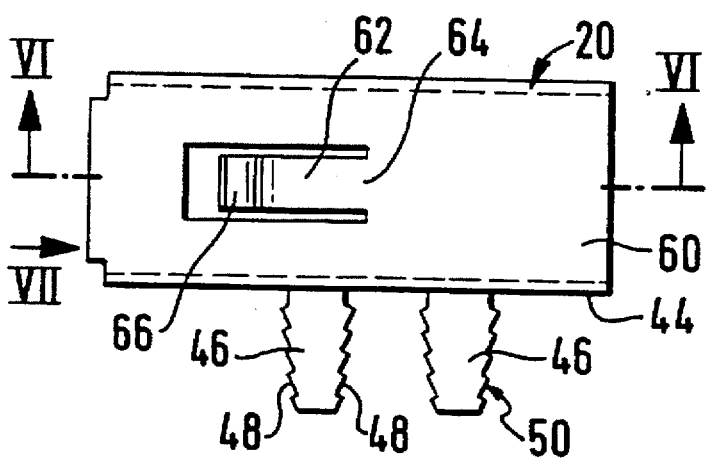

As shown, in particular, by FIGS. 5 and 6, a leaf spring-like press-on element 62 for the brush 22 is arranged on the one casing wall 60. The press-on element 62 is designed as a strip which is cut free from the casing wall 60, the one end 64 of which is integrally connected to the casing wall 60 and the other, free end 66 of which is provided with an offset 68 which projects into the casing when the brush 22 is removed from the casing 20 (FIG. 6). If a brush 22 is now inserted into the casing 20, the press-on element 62 is pressed outward by the brush 22 striking against the offset 68 and bears with a low stress on the one side face of the brush 22. In this way, loading with respect to the opposite inner wall 41 of the guide casing wall 40 takes place, ensuring proper, play-free guidance of the brush 22 in its guide casing 20.

As is shown further by FIG. 6, that end section (illustrated there by dot-dashed lines) of the brush 22 which is remote from the commutator has a groove-like depression 25 on the side face facing the offset 68, into which depression the offset 68 latches into place if the motor armature provided with the commutator 26 is to be mounted. In this latched position, the brush 22 is situated completely outside the space which the commutator 26 occupies when the armature is mounted. Afterwards, the latched connection 68, 25 is released by lifting the press-on element 62 and the spring 23 positions the brush 22 on the contact face 24 of the commutator 26. At the same time, the press-on element ensures play-free guidance of the brush 22 in the guide casing 20.

We claim:

1. An electrical commutator machine having a ring-like carrying plate, which surrounds the axis of rotation of the commutator, for tubular guide casings which are made of metal, have a square cross section, are permanently connected to said carrying plate and in which brushes belonging to the commutation device are guided along the longitudinal axis of the tube and are placed under load on a contact face of the commutator, wherein, in order to secure the casing (20) on the carrying plate (14), at least two tongues (46) which are upright with respect to a plane of a wall (44) of the casing (20) are arranged on one of the casing walls (44), to which tongues there are assigned insertion slits (52) which are located in the one end (54, 40) of the carrying plate (14) and detain the tongues (46), the carrying plate (14) has an end (54) with accommodating slots (28) for the casings (20), and wherein the accommodating slits (52) are arranged on the base area (40) of the slot (28), the width of the slot (28) is greater than the width (34) of the guide casing (20), and wherein there are arranged on the slot side walls (30, 32) partial raised parts (36), on which the casing walls facing them are held in a fitting manner, the raised parts (36) are designed as strips and extend from the base area (40) of the slot (28) to the slot edge (42).

2. An electrical commutator machine having a ring-like carrying plate, which surrounds the axis of rotation of the commutator, for tubular guide casings which are made of metal, have a square cross section, are permanently connected to said carrying plate and in which brushes belonging to the commutation device are guided along the longitudinal axis of the tube and are placed under load on a contact face of the commutator, wherein, in order to secure the casing (20) on the carrying plate (14), at least two tongues (46) which are upright with respect to a plane of a wall (44) of the casing (20) are arranged on one of the casing walls (44), to which tongues there are assigned insertion slits (52) which are located in the one end (54, 40) of the carrying plate (14) and detain the tongues (46), the carrying plate has an end (54) with accommodating slots (28) for the casings (20), and wherein the accommodating slits (52) are arranged on the base area (40) of the slots (28), the width of the slot (28) is greater than the width (34) of the guide casing (20), and wherein there are arranged on the slot side walls (30, 32) partial raised parts (36), on which the casing walls facing them are held in a fitting manner, the raised parts (36) on the one slot side wall (30) are offset with regard to the raised parts (36) on the other slot side walls (32).

3. An electrical commutator machine having a ring-like carrying plate, which surrounds the axis of rotation of the commutator, for tubular guide casings which are made of metal, have a square cross section, are permanently connected to said carrying plate and in which brushes belonging to the commutation device are guided along the longitudinal axis of the tube and are placed under load on a contact face of the commutator, wherein, in order to secure the casing (20) on the carrying plate (14), at least two tongues (46) which are upright with respect to a plane of a wall (44) of the casing (20) are arranged on one of the casing walls (44), to which tongues there are assigned insertion slits (52) which are located in the one end (54, 40) of the carrying plate (14) and detain the tongues (46), the carrying plate has an end with accommodating slots (28) for the casings (20), and wherein the accommodating slits (52) are arranged on the base area (40) of the slot (28), the width of the slot (28) is greater than the width (34) of the guide casing (20), and wherein there are arranged on the slot side walls (30, 32) partial raised parts (36), on which the casing walls facing them are held in a fitting manner.

4. An electrical commutator machine having a ring-like carrying plate, which surrounds the axis of rotation of the commutator, for tubular guide casings which are made of metal, have a square cross section, are permanently connected to said carrying plate and in which brushes belonging to the commutation device are guided along the longitudinal axis of the tube and are placed under load on a contact face of the commutator, wherein, in order to secure the casing (20) on the carrying plate (14), at least two tongues (46) which are upright with respect to a plane of a wall (44) of the casing (20) are arranged on one of the casing walls (44), to which tongues there are assigned insertion slits (52) which are located in the one end (54, 40) of the carrying plate (14) and detain the tongues (46), the carrying plate (14) has an end (54) with accommodating slots (28) for the casings (20), and wherein the accommodating slits (52) are arranged on the base area (40) of the slot (28), at least one elevation (42) is arranged on the base area (40) of the slot (28).

5. The electrical commutator machine as claimed in claim 4, wherein the tongues (46) are integrally connected to the casing (20) and are bent out from the wall (44) of the casing (20).

6. The electrical commutator machine as claimed in claim 4, wherein the side edges (48) of the tongues (46) converge and are provided with a sawtooth profile (50).

7. The electrical commutator machine as claimed in claim 18, wherein the boundaries (56), facing the sawtooth profile (50), of the insertion slits (52) are narrower, at least in sections, than the width of the tongue profile.

8. The electrical commutator machine as claimed in claim 4, wherein a leaf spring press-on element (62) is secured by its one end on the one casing wall (60), and wherein the other, free end (66) of the press-on element (62) bears with prestress on that side face of the brush (22) which faces it.

9. The electrical commutator machine as claimed in claim 8, wherein the press-on element (62) is a strip which is cut free from the casing wall (60), the one end (64) of which is integrally connected to the casing wall (60) and the other, free end (66) of which is provided with an offset (68) which projects into the casing (20) when the brush (22) is removed from the casing (20).

10. The electrical commutator machine as claimed in claim 9, wherein the brush (22) has a depression (25) on its end section remote from the commutator, into which depression the offset (68) of the press-on element (62) latches into place and secures the brush (22) in a mounting position.

* * * * *